United States Patent [19]
Wolfmaier et al.

[11] Patent Number: 6,139,087
[45] Date of Patent: Oct. 31, 2000

[54] KINEMATIC FOLDING TOP FOR PASSENGER CARS

[75] Inventors: Christof Wolfmaier, Bahngasse 4, D-73614 Schorndorf, Germany; Mathias Fröschle, Ostfildern, Germany

[73] Assignee: Christof Wolfmaier, Schorndorf, Germany

[21] Appl. No.: 09/155,038

[22] PCT Filed: Feb. 25, 1997

[86] PCT No.: PCT/DE97/00332

§ 371 Date: Sep. 17, 1998

§ 102(e) Date: Sep. 17, 1998

[87] PCT Pub. No.: WO97/37866

PCT Pub. Date: Oct. 16, 1997

[30]      Foreign Application Priority Data

Apr. 3, 1996 [DE]   Germany .......................... 196 13 356

[51] Int. Cl.[7] ..................................................... B60J 7/00
[52] U.S. Cl. .................. 296/107.16; 296/116; 296/122; 296/107.05
[58] Field of Search .............................. 296/107.01, 116, 296/122, 120.1, 107.05; 280/256

[56]                References Cited

U.S. PATENT DOCUMENTS

| | | | |
|---|---|---|---|
| 3,473,842 | 10/1969 | Bracey et al. ........................... | 296/116 |
| 4,840,419 | 6/1989 | Kolb ..................................... | 296/120.1 |
| 4,927,202 | 5/1990 | Wagner et al. ..................... | 296/107.01 |
| 4,929,015 | 5/1990 | Bauer ................................. | 296/116 |
| 4,991,902 | 2/1991 | Schrader et al. ........................ | 296/116 |
| 5,004,291 | 4/1991 | Bauer et al. ............................. | 296/122 |
| 5,335,959 | 8/1994 | Schrader et al. ......................... | 296/116 |
| 5,385,381 | 1/1995 | Moore et al. ........................... | 296/122 |
| 5,520,432 | 5/1996 | Gmeiner et al. .................... | 296/107.01 |
| 5,769,483 | 6/1998 | Danzl et al. .............................. | 296/116 |
| 5,810,422 | 9/1998 | Corder et al. ............................ | 296/116 |
| 5,829,821 | 11/1998 | Aydt et al. ............................. | 296/122 |
| 5,839,778 | 11/1998 | Schaible et al. .................... | 296/107.01 |

FOREIGN PATENT DOCUMENTS

| | | |
|---|---|---|
| 733 270 | 2/1943 | Germany . |
| 44 41 666 | 12/1995 | Germany . |
| WO 92 18343 | 10/1992 | WIPO . |

*Primary Examiner*—Joseph D. Pape
*Assistant Examiner*—Kiran Patel
*Attorney, Agent, or Firm*—Nilles & Nilles SC

[57]              ABSTRACT

A folding top for a convertible has two roof frames which run along the longitudinal sides. Each of these roof frames is divided into three sections. The rear of these sections is connected to a pivot on the body and, by means of a further pivot, to the central frame piece. The front frame piece is linked to the central frame piece with the aid of a parallelogram link arrangement which is configured in such a way that during opening the front frame piece is guided upward onto the central frame piece, so that the roof lining is not exposed even when the folding top is open.

24 Claims, 4 Drawing Sheets

KINEMATIC FOLDING TOP FOR PASSENGER CARS

BACKGROUND OF THE INVENTION

The folding top of convertible automobiles and roadsters should be able to be closed and opened as easily as possible. In the open position, it should take up as little space as possible, since the space required to stow the folding top reduces the space available in the trunk.

Although a simple tarpaulin would be the most favorable solution with regard to the space taken up, opening a tarpaulin roof requires a relatively large amount of work. Folding tops with roof frames, which ensure that the folding top is automatically made taut during closure and that the cover is laid down in a more or less correct arrangement during opening are significantly more favorable from the handling aspect.

However, the ease of handling should not be at the expense of an excessive weight, because this, conversely, would make the ease of handling worse.

Irrespective of how the roof frame is designed, it is necessary to ensure that even in the event of careless handling it is impossible for any parts of the cover to become clamped in moving parts of the roof frame and cut through.

A roof-frame structure which is particularly favorable with regard to the technical complexity and operation consists in dividing the lateral roof frames into a plurality of pieces which are connected to one another by pivots. This pivoted connection is particularly advantageous, in the case of kinematic folding tops of convertibles, if each of the two lateral roof frames is divided into four pieces. When opening the folding top, the roof would fold together in the manner of a concertina, that section of the folding top which, in the closed position, is adjacent to the windshield lying on the top of the stack when the folding top is open, specifically in such a way that the outside of the roof also faces outward. As a result, in the folded-down position, the top section of the folding top automatically protects those parts of the roof lining or the roof inner side which are situated beneath it and are relatively sensitive to contamination.

In this type of kinematic folding top, the outer side of the roof remains on the outside of the folding top assembly even in the open position, and as a result effectively precludes undesirable contamination of the roof lining.

To this extent, kinematic folding tops in which the roof frames have only three sections are disadvantageous. In the case of such a folding top, during opening the front section, which is adjacent to the windshield, moves onto the folded-down folding top assembly with the roof lining side on the outside. In this case, contamination of the roof lining in the front region, corresponding to the front section of the kinematic folding top, is inevitable. It is certain that this section of the roof lining will become discolored more quickly than the remaining part. When the folding top is closed, a dirty strip will soon become visible on the roof lining. This contamination is promoted or accelerated by the user neglecting to pull the safety hoods over the folding top assembly when the folding top is open, since this represents additional work.

OBJECTS AND SUMMARY OF THE INVENTION

Owing to their nature, such three-membered folding tops are used in vehicles with a short roof, as is the case with compact vehicles or roadsters.

In view of the above, the object of the invention is to provide a convertible automobile in which there is no risk of the roof lining becoming dirty prematurely and in which the lateral roof frame is divided into an odd number of sections.

This object is achieved according to the invention by means of the convertible automobile having the features of claim 1.

The use of the parallelogram link arrangement to link the front frame piece avoids the turning-back movement which otherwise inevitably occurs when opening the folding top. Rather, the front section of the kinematic folding top is moved over the central piece, with the aid of the parallelogram link arrangement, the outer side of the roof remaining on the outside even with the folding top assembly folded down, thus automatically protecting those areas of the roof lining which are situated beneath it, namely in particular also the roof lining area of the central section. This is because this central region is folded with the roof inner side or lining side upward during opening, owing to the very simple pivoted connection between the central frame piece and the rear frame piece. The front section, which moves over it during opening, covers the exposed part of the roof lining and protects it from contamination even if the user fails to pull any special protective cover or safety hood over the opened folding top.

The connection between the individual frame pieces is particularly stable if both the parallelogram link arrangement and the pivot-like connections have only a degree of freedom.

Opening and closing of the folding top are made considerably more simple if a control device is present which, in the event of a relative movement between the rear frame piece and the central frame piece, effects a movement between the central frame piece and the front frame piece. Such a control device may comprise at least one control lever, preferably two control levers, one control lever being assigned to each side of the roof. This avoids crooked, asymmetric actuation of the folding top during opening and closing.

The control lever is expediently rotatably connected to the central frame piece and, via a slide-link device, actuates the front frame piece associated with the relevant side.

The actuation of this control lever is advantageously forcibly coupled to the movement of the rear frame piece. This can be achieved by designing the control lever as a two-armed lever and by the control lever projecting above the location where it is articulated to the central frame piece, its projecting end being articulatedly connected to the body.

The parallelogram link arrangement advantageously comprises two links which pivot essentially parallel to one another. Such an arrangement avoids the risk of stiffness as a result of jamming.

If the rear or lower edge of the cover is attached to a cross member which is articulatedly connected to the body, there is the possibility, by pivoting this cross member, of making the rear parcel shelf area accessible from the outside. This is very particularly advantageous in particular in the case of convertibles of compact design if additional storage space is provided behind the parcel shelf region of the folding top.

This measure also allows the area which is provided for stowing the folding top to be used as a luggage store when the folding top is closed.

The kinematic folding top can be simplified further if the roll bar, which is often present in any case in convertibles, simultaneously has the function of a cross member. In the closed position, the cover is tensioned over the roll bar which presses the cover outward.

If the roll bar is narrower than the roof, a rod-shaped reinforcement element may be inserted in the folding top at this location, which reinforcing element, owing to its inherent rigidity, keeps the folding top taut to the sides of the roll bar. This avoids the cover falling inward at the sides in the region of the roll bar.

Refinements to the invention furthermore form the subject matter of subclaims.

BRIEF DESCRIPTION OF THE DRAWINGS

An exemplary embodiment of the subject matter of the invention is illustrated in the drawing, in which.

DESCRIPTION OF THE PREFERRED EMBODIMENTS

Figure 1:
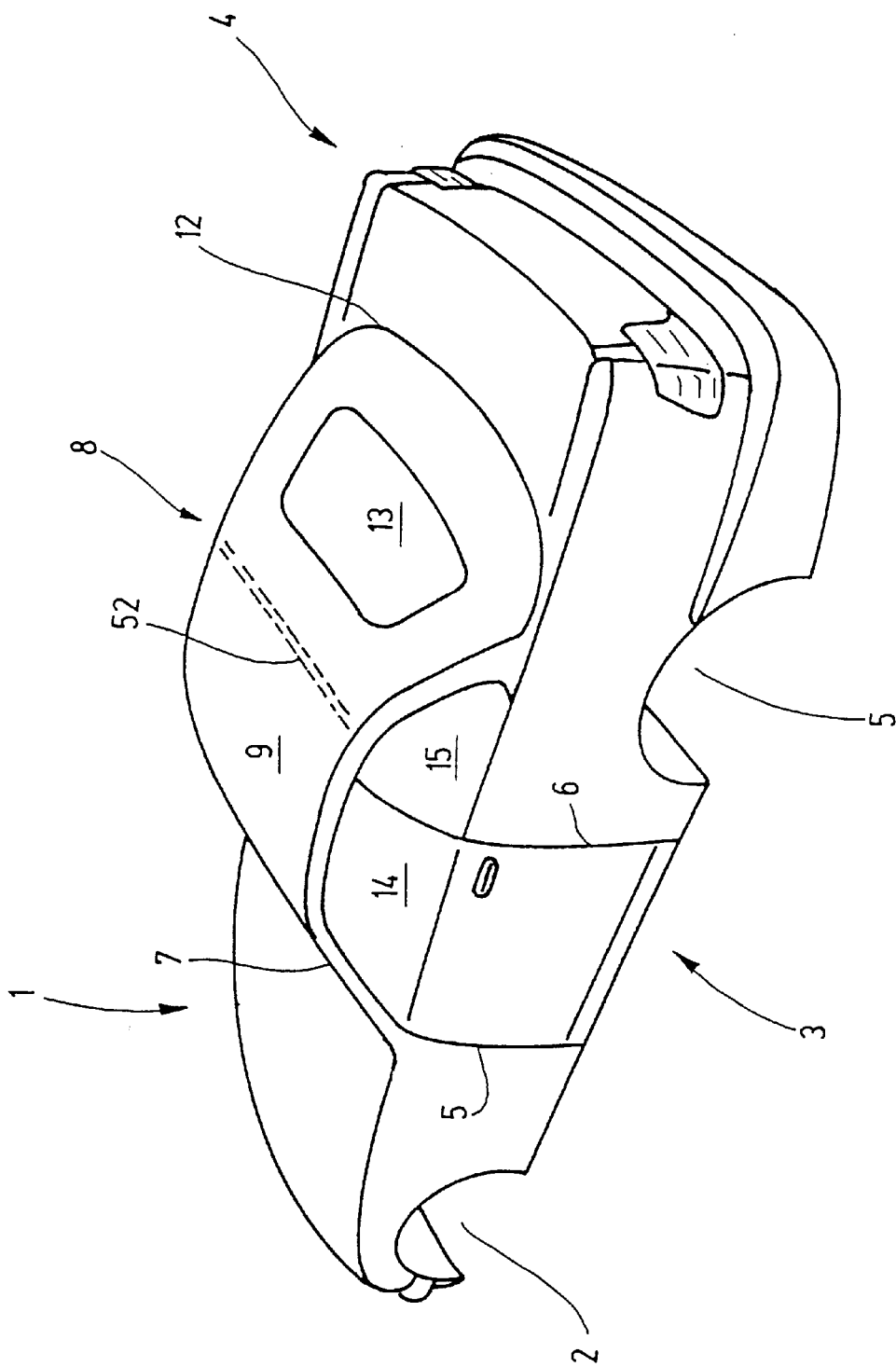
FIG. 1 shows a perspective rear view, at an angle from above, of a convertible.

FIG. 1 diagrammatically depicts a body for a convertible coupe. The body has a front section 1 with wheel openings 2 for front wheels, a passenger cell 3 which adjoins the front section 1, and a rear section 4. Wheel openings 5 for rear wheels are situated toward the bottom of the transition between the passenger cell 3 and the rear section 4.

In the region of the passenger cell 3, the body contains a door cutout, the front end of which is delimited by an A-column 5 and the rear end by a B-column 6. The A-column 5 continues upward into the region of a windshield 7, while the B-column ends at the level of the rail, i.e. below the edge of the window.

Figure 2:
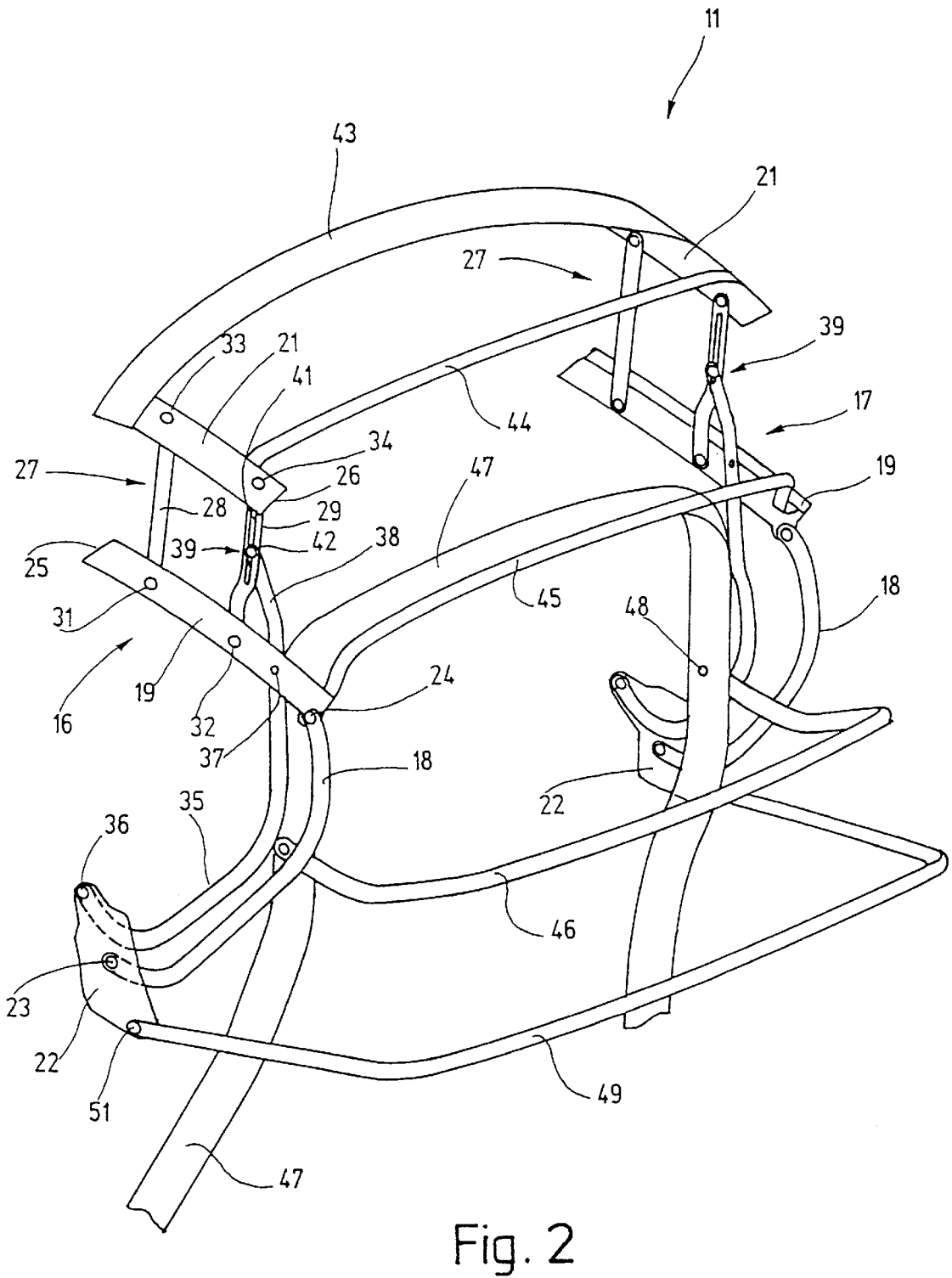
FIG. 2 shows the framework, which is situated in an intermediate position, of the kinematic folding top of the automobile in accordance with FIG. 1, with the cover having been omitted, in a perspective view from the same direction as FIG. 1, and FIGS. 3 and 4 show a side view of different positions of the framework of the kinematic folding top of the automobile in accordance with FIG. 1.

The passenger cell 3 is covered by a kinematic or folding top 8, the cover 9 of which can be seen in FIG. 1, while FIG. 2 provides a very diagrammatic illustration of the framework 11 belonging to the folding top 8. In FIG. 2, it is shown in perspective in an intermediate position between the completely open position and the completely closed position.

The cover 9 of the kinematic folding top 8 extends from the top edge of the windshield 7 as far as a rear bottom edge 12 which represents the position of the rail in the rear section 4. A rear window 13 which is made from an elastic, transparent material is situated in a cutout in the cover 9.

To the sides, the cover 9 extends as far as top edges of side windows 14 and 15.

Two lateral roof frames 16 and 17, which are identical and mirror-symmetrical, belong to the framework 11. It is therefore sufficient to give a detailed description of only one of the two roof frames 16 and 17. The explanation also applies in the same way to the respectively other roof frame 16, 17, the components of which are provided with the same reference numerals.

The framework 11 is provided, for a folding top 8, with an odd number of sections, in this particular case with three sections. Accordingly, the roof frame 16, like the roof frame 17, is composed of three frame pieces 18, 19 and 21. When the folding top 8 is closed, these roof frames 16 and 17 each run above the top edges of the side windows 14 and 15.

In detail, the arrangement is as follows:

A fitting 22 to which the rear frame piece 18 is articulatedly connected by means of a pivot 23, is fastened in the body approximately above the rear wheel opening 5. The pivot axis of the pivot 23 lies at right angles to the longitudinal axis of the vehicle. The rear frame piece 18 is a curved strut which approximately follows the contour of the rear edge of the rear side window 15. Approximately above an extension of the B-column 6, the rear frame piece 18 is rotatably connected to the central frame piece 19 by means of a pivot 24 which is axially parallel to the pivot 23. When the folding top is closed, this central frame piece 19 runs above the top edge of the rear side window 15 and of the front side window 14. Consequently, the central frame piece 19 has a significantly greater extent than the rear frame piece 18. At a suitable distance from the top edge of the windshield 7, the central frame piece 19 ends at a stop 25 which, when the folding top 8 is closed, interacts with a complementary stop 26 on the front frame piece 21. The front frame piece 21 is dimensioned in such a way that it leads from the central frame piece 19 as far as the top edge of the windshield 7.

The central frame piece 19 and the front frame piece 21 are connected to one another by means of a parallelogram link arrangement 27. This parallelogram link arrangement 27 comprises a front parallelogram link 28 and a rear parallelogram link 29. These parallelogram links 28, 29 are of approximately equal length and are rotatably connected at their lower end, by means of pivots 31 and 32, to the central frame piece 19. The axes of these pivots 31 and 32 are parallel to the axes of the pivots 24 and 23.

The top ends of the links are articulatedly connected to the front frame piece 21 with the aid of further pivots 33 and 34 which are axially parallel to the pivots mentioned above.

The length of the links 28 and 29 and the position of the pivots 31, 32 on the central frame piece 19, as well as the position of the pivots 33 and 34 on the front frame piece 21 are dimensioned in such a way that when the folding top is closed the front frame piece 21 runs in line with the central frame piece 19, while at the same time the stop 26 bears against the stop 25. These two stops 25 and 26 are arranged at a slight angle, in such a way that during the closure movement the front frame piece 21 which is moving in from above comes to a stop against the stop 25, which blocks a downwardly directed movement.

The links 28 and 29 are otherwise arranged in such a way that the front frame piece 21 can move through an area which is situated above the frame piece 19, i.e. the pivot 33 does not quite describe a semicircle of which approximately half is situated above the central frame piece 19. The pivot 34 also describes a semicircle above the central frame piece 19, but this semicircle is set further back than the first semicircle, toward the rear end of the frame piece 19.

In order to simplify operation of the folding top 8, in that the frame pieces 18, 19 and 21 are moved synchronously, a two-armed control lever 35 is provided. Without this control lever 35, each of the frame pieces 18, 19 and 21 could be moved separately without changing the position of the remaining frame pieces.

The control lever 35 is a strut which follows the contour of the frame piece 18 and is articulatedly connected, by means of a pivot 36, to the fitting 22 which is fixed to the body. From there, the control lever 35 runs approximately parallel to the frame piece 18, running as far as the central frame piece 19. It is articulatedly connected to the central frame piece 19 between the pivot 32 and the pivot 24 by means of a pivot 37. The result is a type of parallelogram link which is used to prevent the central frame piece 19 from folding downward as soon as the roof frame 16—and the same applies to the roof frame 17—is no longer bearing against the top edge of the windshield 7. The control lever 35 runs between the side window 15 and the frame piece 18.

The control lever 35 is extended upward beyond the pivot 37, where it forms a section 38 which is connected, via a slide-link guide 39, to the rear link 29. The slide-link guide 39 comprises an elongate hole 41 which extends in the link 29, in the longitudinal direction thereof, and a pin 42 which projects into the elongate hole 41 and represents the complementary slide-link block.

As an alternative to the slide-link guide 39, it would also be possible to use a lever which is arranged between the control lever 35 and the rear link 29.

As already mentioned above, the arrangement in the region of the roof frame 17 is mirror-symmetrical to the extent that the mirror-symmetrical link arrangement 27 and the mirror-symmetrical control lever 35 and the mirror-symmetrical fitting 22 are present there.

As for the rest, all the abovementioned pivots which connect the roof-frame sections 18, 19 and 21 to one another and to the links 28, 29 and the control lever 35 are axially parallel to one another, and the axes of the left-hand sides are aligned with the axes of the right-hand side of the framework 11.

In order to keep the cover 9 as taut and strong as possible, the two front frame pieces 21 are rigidly connected to one another on the left-hand and right-hand sides by means of a transversely running cross member 43. This cross member 43 simultaneously bears the locking members, specifically in a known design, which locking members are used to lock the taut folding top 8 to the top edge of the windshield 7. A further cross member 44 connects the two front frame pieces 21 in the vicinity of their closer pivot 34 so that they cannot move.

In the case of the frame pieces 19, the region of the link arrangement 39 is free of cross members. These central frame pieces 19 are only rigidly connected to one another again in the vicinity of the lower pivot 24, with the aid of a cross member 45.

Depending on the design of the vehicle, further cross members may be provided on the two rear frame pieces 18. However, the folding top 8 illustrated is provided for a coupe or a vehicle with a similarly short passenger cell. If the passenger cell is short, it is advantageous if the further cross members for reinforcing the cover 9 are not connected to the two roof frames 16, 17. In the embodiment shown, a further cross member 46 is articulatedly connected to a roll bar 47 with the aid of pivots 48. The roll bar 47 is rigidly anchored in the body.

Finally, the folding top 8 has a final or lower cross member 49 at the level of the rail, which cross member is likewise articulatedly connected to the fitting 22 with the aid of pivots 51.

While the cross members 43, 44 and 45 are practically straight or are only slightly curved, the cross members 46 and 49 are of a significantly U-shaped design, so that their section which runs parallel to the roof surface is at a sufficient distance from the relevant pivots 48 and 51.

It will be understood that in a practical form of the folding top 8 the framework 11 is advantageously embedded between the external watertight cover 9 and a roof lining, which is not shown in the figures. Moreover, at least the cover 9 is connected in a known manner and at suitable positions to the cross members and the roof frames 16, 17; for the sake of clarity, the anchoring points for attaching the cover 9 are not illustrated for any of these components, since they are not necessary for an understanding of the invention and the drawings would merely become overloaded with incidental details.

In addition, in the novel folding top 8, the roll bar 47 is also used as a cross member for reinforcing the folding top 8, specifically the top, transversely running part of the roll bar 47. Since this part is situated inside the two roof frames 16 and 17, in order not to impede the opening and closing movement of the folding top 8, its transversely running part is shorter than the cross members or the required width of the folding top 8. In order to prevent the cover 9 from falling inward at the sides at this location, a rod-shaped reinforcement member 52 is attached to the cover 9, which reinforcement member is indicated in FIG. 1 by dashed lines. When the folding top is closed, the rod-shaped reinforcement member 52 lies on the transversely running part of the roll bar 47 and thus supports those parts of the cover 9 which project laterally beyond the roll bar 47.

Figure 3:
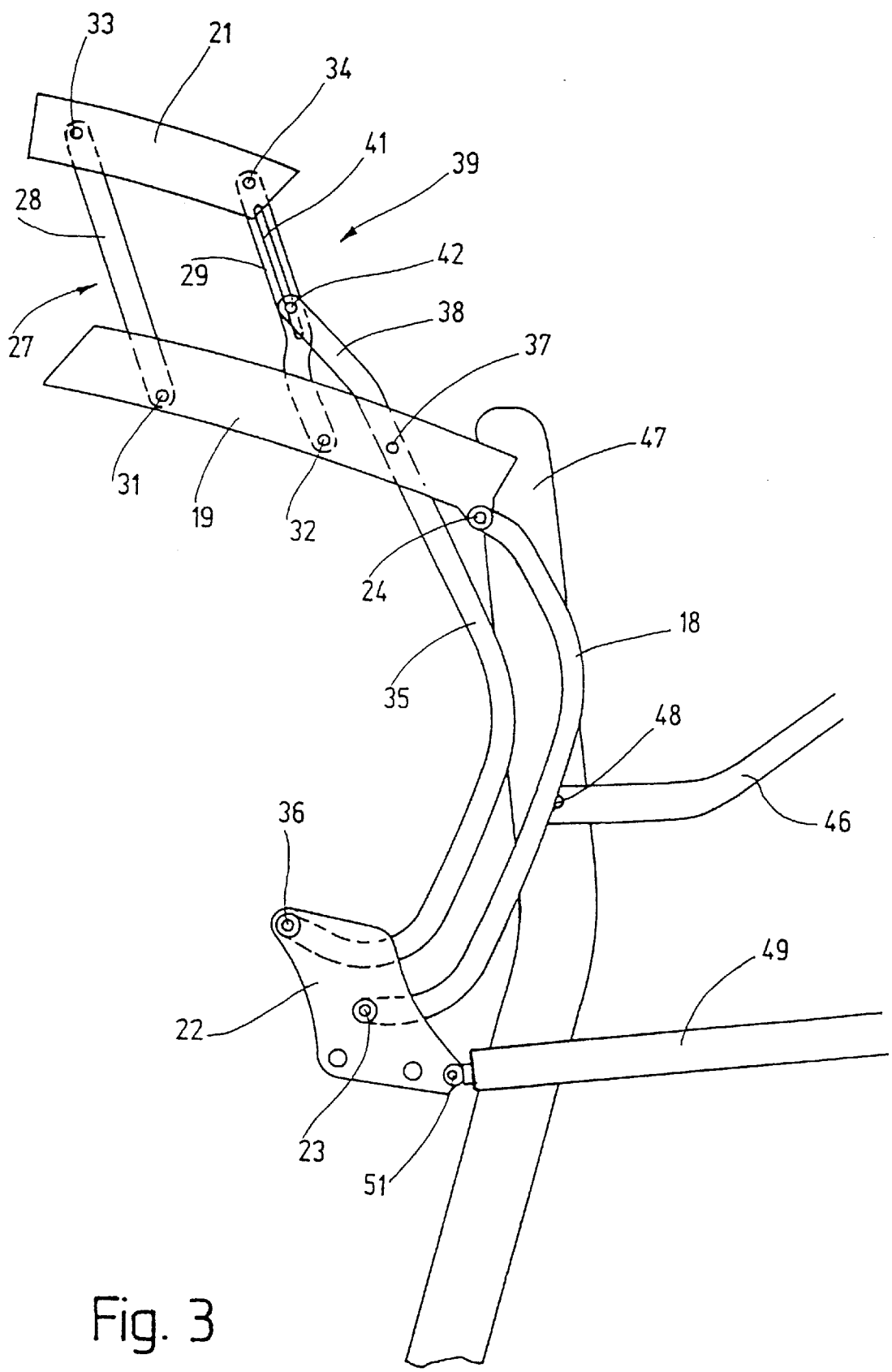
Figure 4:
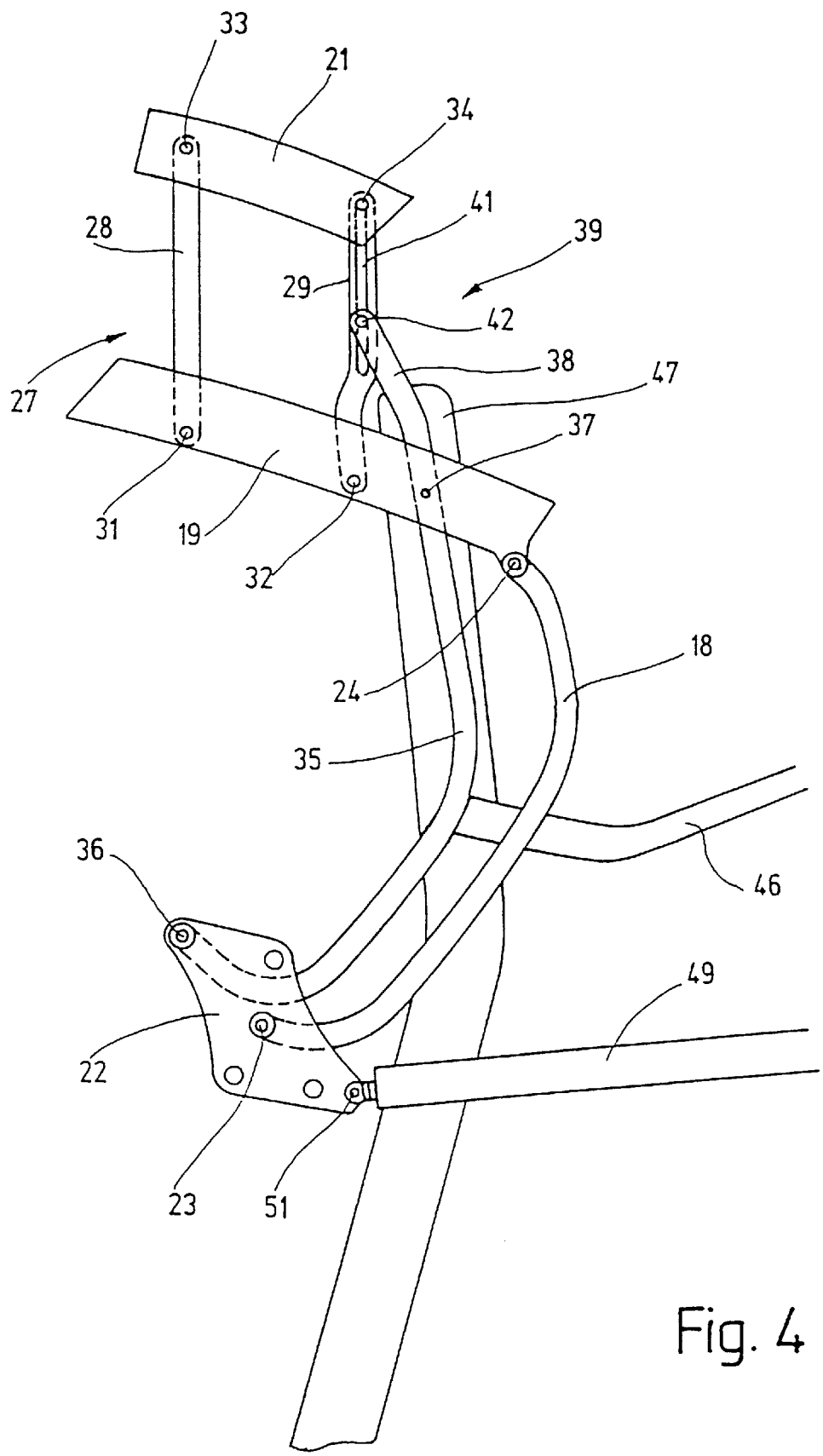

In a side view of the left-hand side of the framework 11, FIGS. 3 and 4 show the frame pieces 18, 19 and 21 and the associated levers, in different opening positions.

In order to explain the kinematics of the novel folding top 8, it is assumed that it is in the closed position in accordance with FIG. 1. In this position, the front cross member 43 is locked to the top edge of the windshield 7 with the aid of locking members. The front frame section 21 runs as a smooth, stepless continuation of the central frame piece 19, the stop 26 butting against the stop 25. The interaction between the stops 25, 26 prevents the possibility of the front frame piece 21 being pressed downward with respect to the central frame piece 19, i.e. of the front frame piece 21 being, as it were, guided downward around the central frame piece 19. The two links 28 and 29 of the parallelogram link arrangement 27 lie virtually parallel to the central and front frame pieces 19 and 21. Suitable bending, which is not shown further in the drawings, prevents the rear link 29 from colliding with the pivot 31. In this position, the connection between the front and central frame pieces 21, 19, in the region of the mutually abutting stops 25 and 26, is resistant to pressure from forces which at this connection point act perpendicularly from the top downward.

The two frame pieces 19, 21, with a continuous profile, essentially follow the contour of the top edge of the two side windows 14, 15. The pivot 24 or the pivot 37 lies approximately in the position where the top edge of the rear side window 15 begins to descend significantly downward toward the rail. The control lever 35 and the rear frame piece 18, which are set back with respect to the corresponding edge of the rear side window 15, follow the outer contour thereof.

The cover 9 is held taut between the cross member 43 and the cross member 49, and is reinforced in the transverse direction, starting from the windshield 7, initially by the cross member 43, then by the cross member 44 and subsequently by the cross member 45. The next reinforcement is the strake 52, which rests on the roll bar 47. There then follows, above the rear window 13, the reinforcement provided by the cross member 46, which is articulatedly connected to the roll bar 47, and finally, at the level of the rail along the contour line 12, the reinforcement provided by the cross member 49.

When the folding top 8 is closed, the articulatedly connected cross member 49 can be lifted with respect to the rail of the rear section 4 by opening corresponding locking members (not shown) on the inside. As a result, the area in the region of the "rear parcel shelf" becomes accessible from outside. In a convertible, the folded-down folding top is accommodated in this region. Owing to the movable arrangement of the cross member 49, this area for stowing the folding top 8 is accessible from the outside and, when the folding top 8 is closed, can be used as a special storage or luggage space which is easily accessible from the outside.

In order to open the folding top, firstly the locking members which connect the cross member 43 to the top edge of the windshield 7 in a form-fitting manner are opened. Then, the folding top 8 can be taken hold of by means of this cross member 43 and moved backward toward its storage area. The two frame pieces 18 and 19 fold together at the pivot 24, the central frame piece 19 being prevented from falling down by the lower part of the control lever 35, which acts in the manner of a parallelogram link. When the folding top 8 is being folded down, in the illustration shown—FIGS. 3 and 4 show a view of the left-hand side of the vehicle—the rear frame piece 18 pivots backwards in the clockwise direction about its pivot 23. The control lever 35 also performs a movement in a parallel or identical direction in its lower region, but about the pivot 36. This backward movement of the rear frame piece 18 leads to a folding closure movement between the frame piece 18 and the frame piece 19.

Owing to the resultant relative rotation, which is directed to the right in the clockwise direction, between the control lever 35 and the frame section 19, the front section 38 of the control lever is gradually lifted upward out of a position in which it runs essentially parallel to the central frame section. Since there is a connection between the control lever 35 and the rear link 29, owing to the slide-link guide 39, the link 29 is also increasingly raised, i.e., starting from its position in which it pointed from the central frame section 19 toward the top edge of the windshield 7, it is initially moved into a position in which it points obliquely forward, and from this position, in a further movement, it is moved into a position in which it points virtually vertically upward, as shown by the two phases in accordance with FIGS. 3 and 4.

During this pivoting movement of the link 29, the second link 28 essentially forces a parallel displacement of the front frame piece 21 with respect to the central frame piece 19, so that its underside does not cease to face downward, while the front frame piece 21 is transferred from a position in line with the frame piece 19 into a position above the frame piece 19. FIGS. 3 and 4 show how the frame piece 21 moves over the frame piece 19 to an increasing extent during opening of the folding top 8.

In the completely open position, the rear frame piece 18 lies in the storage space provided therefor in the body, i.e. the frame piece 18 points backward approximately at the level of the rail. The central frame piece 19 rests on the frame piece 18. As a result, the inner side of the roof faces upward in the region of the frame piece 18, while in the region of the frame piece 19 the inner side of the roof faces downward and protects that section of the roof lining which faces upward. This position is not illustrated in the drawing, since it would no longer be possible to distinguish clearly in the drawing between the links and levers lying one inside the other.

Finally, the underside of the frame piece 21 rests on the top side of the frame piece 19. A suitable attachment of the cover 9 or of the roof lining means that, in the region between the two frame sections 19 and 21, the cover 9 is folded together in zigzag form. Consequently, that part of the cover 9 which faces outward between the cross members 43 and 44 remains at the top on the outside of the assembly of the folded-down folding top 8 even when the folding top 8 is open, thus protecting all those parts of the open folding top 8 which lie below it.

When opening the folding top 8, the control lever 35 ensures that the front frame section 21 is laid down correctly when the two frame sections 18 and 19 bend in at the pivot 24.

The correspondingly reversed movement takes place when closing the folding top 8 until the position described initially is reached.

Depending on the size of the bearing clearance of the individual pivots, it may be expedient to arrange an additional locking device (not shown) in the region between the two stops 25, 26, which locking device, when the folding top 8 is closed, reliably prevents a relative vibrating movement between the frame pieces 19 and 21.

Furthermore, it can clearly be seen from the description of the figures that the design shown is suitable for any type of kinematic folding top which has an odd number of folding top sections which bring about a folding-down movement. The only essential feature is that the front three sections are designed as illustrated in the figures. The two further sections in the case, for example, of a five-piece folding top may in turn simply be connected to one another and to the rear frame section 18 by means of pivots.

A folding top for a convertible has two roof frames running along the longitudinal sides. Each of these roof frames is divided into three sections. The rear of these sections is connected to a pivot on the body and, by means of a further pivot, to the central frame piece. The front frame piece is linked to the central frame piece with the aid of a parallelogram link arrangement which is designed in such a way that during opening the front frame piece is guided upward onto the central frame piece, so that the roof lining is not exposed even when the folding top is open.

What is claimed is:

1. A convertible automobile having a body which has A-columns (5), between which a windshield (7) extends, doors which are situated in body cutouts and a rear section (4) as well as a kinematic folding top (8), B-columns (6) rising between the doors and the rear section (4) and the rear section (4) ending at the top at a rear bottom edge (12), having two roof frames (16, 17), articulatedly connected to the body at a distance from one another, and mirror-symmetrical with respect to one another, each roof frame (16, 17) extending between the rear section (4) and the windshield (7) when the folding top (8) is closed, being divided into an odd number of frame pieces (18, 19, 21), namely:

a rear frame piece (18), articulatedly connected to the body, a central frame piece (19) which is articulatedly connected to the rear frame piece (18), and a front frame piece (21), connected to the central frame piece (19) by means of a parallelogram link arrangement (27) in such a manner that the front frame piece (21) can be moved essentially by parallel displacement over the central frame piece (19), having at least one cross member (43, 44, 45) extending between the roof frames (16, 17), and having a cover (9) which is connected to the roof frames (16, 17).

2. The convertible automobile as claimed in claim 1, wherein the parallelogram link arrangement (27) has only a degree of freedom.

3. The convertible automobile as claimed in claim 1, wherein a pivot connection (24) between the central frame piece (19) and the rear frame piece (18) has only a degree of freedom.

4. The convertible automobile as claimed in claim 1, wherein a pivot connection (23) between the rear frame piece (18) and the rear section (4) has only a degree of freedom.

5. The convertible automobile as claimed in claim 1, wherein in the event of a relative movement between the rear frame piece (18) and the central frame piece (19), a control lever (35) and a slide link guide (39) effect a movement between the central frame piece (19) and the front frame piece (21).

6. The convertible automobile as claimed in claim 5, wherein the slide link guide (39) comprises an elongate hole (41) that extends in a rear paralleogram link (29) in the longitudinal direction thereof, and a pin (42) that projects into the elongate hole (41).

7. The convertible automobile as claimed in claim 5, wherein the control lever (35) is articulatedly connected to the central frame piece (19) by means of a pivot (37).

8. The convertible automobile as claimed in claim 5, wherein the control lever (35) is coupled to the parallelogram link arrangement (27) by means of the slide-link guide (39).

9. The convertible automobile as claimed in claim 5, wherein the control lever (35) is articulatedly connected to the body by means of a pivot (36).

10. The convertible automobile as claimed in claim 5, wherein the control lever (35) is a two-armed lever.

11. The convertible automobile as claimed in claim 1, wherein the parallelogram link arrangement (27) has two links (28, 29) which pivot essentially parallel to one another.

12. The convertible automobile as claimed in claim 1, wherein the links (28, 29) are arranged on the inside of the roof frames (17, 18).

13. The convertible automobile as claimed in claim 12, wherein the rear (29) of the two links (28, 29) is provided with a slide-link guide (39).

14. The convertible automobile as claimed in claim 5 wherein the slide-link guide (39) connects the control lever (35) to the parallelogram link arrangement (27).

15. The convertible automobile as claimed in claim 1, wherein at least one cross member (49) is provided, which is essentially connected directly to the body.

16. The convertible automobile as claimed in claim 15, wherein one edge of the cover (9) is attached to the cross member (49) which is essentially connected directly to the body.

17. The convertible automobile as claimed in claim 15, wherein the cross member (49) which is essentially connected directly to the body is pivotably attached to the body in the vicinity of a pivot connection (51).

18. The convertible automobile as claimed in claim 1, which has a roll bar (47) which is rigidly connected to the body and to which a cross member (46) is articulatedly connected by means of a pivot (48).

19. The convertible automobile as claimed in claim 1, which has a roll bar (47) which is rigidly connected to the body and, when the folding top (8) is closed, forms a cross member for the folding top (8).

20. The convertible automobile as claimed in claim 1, wherein at least one rod-shaped reinforcement element (52) is connected to the cover (9).

21. The convertible automobile as claimed in claim 19, wherein the strake (52) is situated at a location which is such that it rests on the roll bar (47) when the folding top (8) is closed.

22. A convertible automobile having a body which has A-columns (5), between which a windshield (7) extends, doors which are situated in body cutouts and a rear section (4) as well as a kinematic folding top (8), B-columns (6) rising between the doors and the rear section (4) and the rear section (4) ending at the top at a rear bottom edge (12), having two roof frames (16, 17), articulatedly connected to the body, at a distance from one another, and mirror-symmetrical with respect to one another, each roof frame (16, 17) extending between the rear section (4) and the windshield (7) when the folding top (8) is closed, and being divided into a number of frame pieces (18, 19, 21), which are connected to one another, having at least one cross member (43, 44, 45) which extends between the roof frames (16, 17) having a cover (9) which is connected to the roof frames (16, 17), and having a roll bar (47) which is rigidly connected to the body and, when the folding top (8) is closed, forms a cross member for the folding top (8).

23. The convertible automobile as claimed in claim 22, wherein at least one strake (52) is connected to the cover (9).

24. The convertible automobile as claimed in claim 23, wherein the strake (52) is situated at a location which is such that it rests on the roll bar (47) when the folding top (8) is closed.

* * * * *